(12) United States Patent
Lopatine et al.

(10) Patent No.: US 12,179,799 B2
(45) Date of Patent: Dec. 31, 2024

(54) INTELLIGENT VEHICLE SYSTEMS AND CONTROL LOGIC WITH ADAPTIVE VEHICLE AUTOMATION FOR USER HEALTH CONDITIONS

(71) Applicant: GM GLOBAL TECHNOLOGY OPERATIONS LLC, Detroit, MI (US)

(72) Inventors: Duncan Lopatine, Athens, GA (US); Russell A. Patenaude, Macomb Township, MI (US); Armando Mendoza, Austin, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 17/881,080

(22) Filed: Aug. 4, 2022

(65) Prior Publication Data
US 2024/0043041 A1     Feb. 8, 2024

(51) Int. Cl.
| | | |
|---|---|---|
| *B60W 40/00* | (2006.01) | |
| *B60W 10/20* | (2006.01) | |
| *B60W 40/08* | (2012.01) | |
| *B60W 50/12* | (2012.01) | |
| *B60W 50/14* | (2020.01) | |
| *B60W 60/00* | (2020.01) | |
| *B60W 50/00* | (2006.01) | |

(52) U.S. Cl.
CPC ........ *B60W 60/0016* (2020.02); *B60W 10/20* (2013.01); *B60W 40/08* (2013.01); *B60W 50/12* (2013.01); *B60W 50/14* (2013.01); *B60W 2050/0083* (2013.01); *B60W 2050/146* (2013.01); *B60W 2540/215* (2020.02); *B60W 2540/221* (2020.02)

(58) Field of Classification Search
CPC .. B60W 60/0016; B60W 10/20; B60W 40/08; B60W 50/12; B60W 50/14; B60W 2540/215; B60W 2540/221; B60W 2050/0083; B60W 2050/146
USPC .......................................................... 701/36
See application file for complete search history.

(56) References Cited

U.S. PATENT DOCUMENTS

| | | |
|---|---|---|
| 7,877,275 B2 | 1/2011 | Ball |
| 9,714,037 B2 | 7/2017 | DeRuyck et al. |
| 9,956,963 B2 | 5/2018 | Vijaya Kumar et al. |

(Continued)

*Primary Examiner* — Tiffany P Young
*Assistant Examiner* — Michael T Dowling
(74) *Attorney, Agent, or Firm* — Quinn IP Law

(57) ABSTRACT

Presented are intelligent vehicle systems and control logic for adaptive vehicle sensing and automation for occupants with health conditions, methods for making/using such systems, and vehicles equipped with such systems. A method of operating a vehicle includes a resident or remote vehicle controller determining an existing health condition of an occupant in the vehicle's passenger compartment. The controller then retrieves, e.g., from a resident or remote memory device, predefined sets of calibration settings and condition symptoms customized to this existing health condition. A network of sensing devices is calibrated using the predefined calibration settings to detect one or more of the predefined condition symptoms. The calibrated sensing devices monitor the occupant to detect a health event based on the predefined condition symptoms. Upon detecting the health event, the controller commands one or more resident vehicle subsystems to execute one or more vehicle operations to mitigate the health event.

20 Claims, 2 Drawing Sheets

(56) References Cited

U.S. PATENT DOCUMENTS

| | | |
|---|---|---|
| 10,331,141 B2 | 6/2019 | Grimm et al. |
| 2008/0174451 A1 | 7/2008 | Harrington et al. |
| 2011/0304465 A1 | 12/2011 | Boult et al. |
| 2014/0310739 A1* | 10/2014 | Ricci ..................... G06F 16/183 |
| | | 725/75 |
| 2019/0361437 A1* | 11/2019 | Wilson ................... G06F 40/58 |
| 2020/0114929 A1* | 4/2020 | Wan ...................... A61B 5/7435 |
| 2022/0028556 A1* | 1/2022 | Tiwari ............... A61B 5/02055 |
| 2022/0032956 A1* | 2/2022 | Wolff ..................... G06V 40/168 |
| 2022/0176779 A1* | 6/2022 | Ghannam ............. G06V 10/143 |
| 2023/0382394 A1* | 11/2023 | Roberts ............. H04M 1/72454 |

\* cited by examiner

INTELLIGENT VEHICLE SYSTEMS AND CONTROL LOGIC WITH ADAPTIVE VEHICLE AUTOMATION FOR USER HEALTH CONDITIONS

INTRODUCTION

The present disclosure relates generally to intelligent control systems of motor vehicles. More specifically, aspects of this disclosure relate to advanced driver assistance systems with adaptive vehicle driving capabilities.

Current production motor vehicles, such as the modern-day automobile, may be equipped with a network of onboard electronic devices that provide automated driving capabilities to help minimize driver effort. In automotive applications, for example, one of the most recognizable types of automated driving features is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing headway spacing between the host vehicle and a leading "target" vehicle. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, Electronic Stability Control (ESC) systems, and other Advanced Driver Assistance Systems (ADAS) are also available on many modern-day automobiles.

As vehicle processing, communication, and sensing capabilities continue to improve, manufacturers will persist in offering more automated driving capabilities with the aspiration of producing fully autonomous "self-driving" vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ intelligent control systems to enable vehicle routing with steering, lane changing, scenario planning, etc. Automated path planning systems utilize vehicle state and dynamics sensors, geolocation information, map and road condition data, and path prediction algorithms to provide route derivation with automated lane center and lane change forecasting.

Many automobiles are now equipped with onboard vehicle navigation systems that utilize a global positioning system (GPS) transceiver in cooperation with navigation software and geolocation mapping services to obtain roadway topography, traffic, and speed limit data associated with the vehicle's real-time location. Autonomous driving and advanced driver assistance systems are often able to adapt automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering, braking, and powertrain control. During assisted and unassisted vehicle operation, the resident navigation system may identify a recommended travel route based on an estimated shortest travel time or estimated shortest travel distance between a route origin and a route destination for a given trip. This recommended travel route may then be displayed as a map trace or as turn-by-turn driving directions on a geocoded and annotated map with optional voice commands output by an in-vehicle audio system.

While automated and autonomous driving features have become ubiquitous among contemporary automobiles, manufacturers typically implement a "one size fits all" approach for such features in which a universal format of vehicle automation is applied to all drivers. Apart from allowing a driver to select a desired driving speed, for example, a vehicle ACC system operates within a calibrated set of operating parameters irrespective of who is operating the vehicle. Put another way, the vehicle ACC system is not designed to accommodate the personal proclivities or physical disabilities of an individual driver. To this end, conventional vehicle control systems do not enable desired or otherwise appropriate changes in ADAS system operation in response to a user providing any of a wide variety of driver-specific inputs, including subjective preferences or health-related driving restrictions. An elderly driver may have poor vision or impaired reaction time relative to that of an average adult driver and may prefer a larger headway distance and more gradual vehicle acceleration/deceleration during a set cruise-control operation. However, most conventional ACC systems are not programmed to effect such preferences or to adapt the system-calibrated operating parameters to compensate for the elderly driver's impaired vision or reflexes.

SUMMARY

Presented herein are intelligent vehicle systems with attendant control logic for provisioning adaptive vehicle sensing and automation to protect drivers with existing health conditions, methods for manufacturing and methods for operating such systems, and motor vehicles equipped with such intelligent control systems. For example, intelligent vehicle systems are disclosed for safeguarding drivers with known or detected health concerns. To militate against vehicle mishaps or collisions caused by drivers with pre-existing medical conditions, an intelligent vehicle system leverages existing in-vehicle sensors to monitor a driver's current health state along with memory-stored driver data enumerating a driver's preexisting health conditions. By aggregating, filtering, and analyzing this data, the system actively determines whether or not the driver is in distress and, if so, responsively triggers a series of preventative measures. System monitoring parameters, sensing calibrations, diagnosis metrics, and ameliorative responses may be adapted and tailored to a set of driver-defined health conditions and setting preferences.

By receiving advanced notification of an existing health condition, the vehicle control system is able to modulate the in-vehicle sensors to monitor for and detect specific characteristics of the condition and adapt vehicle ADAS functionality to mitigate a resultant episode. Upon detecting the onset of a health-related episode, such as a seizure, heart attack, asthma attack, narcolepsy, etc., the vehicle system may temporarily disable the accelerator pedal and activate an auto-steer protocol to guide the vehicle to the shoulder of the road. Optionally, the vehicle system may automate power seat controls to shift the driver to a preset protected position and posture (e.g., seat bottom moves upward and backward to shift the driver away from the pedals and onto their side). As yet a further option, the driver's seatbelt may be automatically unbuckled, the vehicle hazard lights may be activated, and an emergency medical services (EMS) team may be contacted.

The intelligent vehicle system framework may be adapted and applied to various medical needs. For an occupant prone to seizures, for example, seat sensors and internal cameras may be calibrated to work together to detect if the driver is experiencing a seizure. Seat sensors detecting constant shifts in weight concurrent with a passenger cabin camera capturing images of irregular human movement may be deemed as characteristics indicative of a seizure. Upon detection, the intelligent vehicle system may disable the accelerator pedal and steering wheel and trigger a pull-over mode.

These procedures may be applied to any relevant health condition that may detrimentally affect a vehicle occupant. For an individual that may be prone to an asthma or panic attack, a passenger cabin camera and interior microphone may be calibrated to cooperatively detect the onset of an asthma/panic attack. If an asthma attack is detected, for example, the intelligent vehicle system may responsively turn down or turn off cabin air conditioning (e.g., cold air may complicate asthma) and, optionally, may close any open vehicle windows. The occupant's seat may also be commanded to an upright position concurrent with activation of a distinct safeguard protocol. For a driver that may be prone to a heart attack, a wearable electronic monitor may collaborate with an interior camera to determine if the driver is having a heart attack. A rapid increase in heartbeat in parallel with irregular driver movement may indicate the onset of a heart attack; the vehicle may automatically enter a distinct safeguard protocol and contact first responders. For occupants that may be prone to narcolepsy, an interior camera may detect if the user has passed out; the system may automatically engage a distinct safeguard procedure; this mode may include protocols to pull over the vehicle or drive the vehicle to the nearest medical center (e.g., depending on the host vehicles level of autonomous driving capabilities).

Aspects of this disclosure are directed to smart vehicle systems, system control logic, and memory-stored instructions for provisioning adaptive vehicle sensing and automation for occupants with health conditions. In an example, a method is presented for operating a vehicle with a passenger compartment containing a network of sensing devices that communicates with a resident or remote vehicle controller. This representative method includes, in any order and in any combination with any of the above and below disclosed options and features: determining, e.g., via the vehicle controller from memory-stored, driver-specific data, an existing health condition of an occupant in the passenger compartment; retrieving, e.g., via the vehicle controller from a resident or remote memory device, predefined sets of calibration settings and condition symptoms that are customized to the occupant's health condition; calibrating, e.g., via the vehicle controller, one or more of the passenger compartment sensing devices using the predefined calibration settings to enhance detection or one or more symptoms in the set of condition symptoms; monitoring, e.g., via the vehicle controller using the calibrated sensing device(s), the occupant to detect onset of a health-related event based on the predefined condition symptoms; and transmitting, e.g., via the vehicle controller responsive to detecting the health-related event, one or more command signals to one or more resident vehicle subsystems to execute one or more vehicle control operations designed to mitigate the health-related event.

Aspects of this disclosure are also directed to computer-readable media (CRM) for enabling adaptive vehicle automation for occupant health conditions. In an example, a non-transitory CRM stores instructions executable by one or more processors of a resident or remote vehicle controller or controller network. These instructions, when executed by the processor(s), cause the controller to perform operations, including: determining an existing health condition of an occupant in the passenger compartment; retrieving, from a memory device, a predefined set of calibration settings and a predefined set of condition symptoms both customized to the existing health condition; calibrating one or more sensors in the network of sensing devices using the predefined set of calibration settings to detect one or more symptoms in the predefined set of condition symptoms; monitoring, using the calibrated network of sensing devices, the occupant to detect a health-related event based on the predefined set of condition symptoms; and transmitting, responsive to detecting the health-related event, one or more command signals to one or more resident vehicle subsystems of the vehicle to execute one or more vehicle control operations configured to mitigate the health-related event.

Additional aspects of this disclosure are directed to motor vehicles with intelligent vehicle systems executing control logic for protecting occupants with health concerns. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, which may be in the nature of an internal combustion engine (ICE) assembly (e.g., for ICE powertrains), an electric traction motor (e.g., for FEV powertrains), or both (e.g., for HEV powertrains), selectively drives one or more of the road wheels to propel the vehicle. The passenger compartment contains a network of sensing devices that is operable to monitor occupant movement and behavior.

Continuing with the preceding discussion, the vehicle is also equipped with a vehicle controller (e.g., single controller, network of controllers, resident/remote IC devices, etc.) that is programmed to determine an existing health condition of a vehicle driver or other vehicle occupant and then retrieve, e.g., from a resident or remote memory device, predefined sets of calibration settings and condition symptoms customized to their health condition. The controller then calibrates one or more of the networked sensing devices using the predefined calibration settings to more readily detect one or more of the condition-related symptoms. Using the calibrated sensing device(s), the controller monitors the occupant to detect the onset of a health-related event based on the predefined condition symptoms. If a health-related event is detected, the controller responsively commands one or more resident vehicle subsystems to execute one or more vehicle control operations designed to mitigate the health-related event.

For any of the disclosed systems, methods, and vehicles, the predefined calibration settings may include, for at least one of the networked sensing devices, a modified sensor sensitivity level and/or a modified sensor key-point trigger, both of which are designed to improve detecting at least one of the condition symptoms associated with the existing health condition. As another option, the predefined condition symptoms may include a respective list of objective physical characteristics (e.g., an observable medically recognized sign) that is indicative of the occupant's health condition. Since each health condition may necessitate a tailored vehicle response, the vehicle controller may access resident or remote memory to retrieve a respective response protocol that has been customized to the health-related event of the existing health condition. In this instance, a vehicle control operation executed by a resident vehicle subsystem is based, in whole or in part, on this respective response protocol.

For any of the disclosed systems, methods, and vehicles, the vehicle controller may actively or passively determine whether or not the host vehicle has autonomous driving capabilities (e.g., SAE Levels 4 or 5 autonomy). If so, the controller may responsively command multiple vehicle subsystems (e.g., steering, braking, powertrain, etc.) to autonomously drive the host vehicle to a health care facility. Before executing the foregoing feature, the controller may first receive, retrieve, or generate (e.g., "determine") a predicted route for traversing from the host vehicle's current location to the health care facility's location. This predicted route may then be presented to the vehicle occupant(s); the vehicle controller then receives a user input from an occupant, e.g., via a human-machine interface (HMI), approving the predicted route. In this instance, the controller transmits the command signals to autonomously drive the vehicle to the health care facility in response to receiving the user's approval of the predicted route. This approval step may be omitted, e.g., where it is expected that the occupant is in distress or incapacitated.

For any of the disclosed systems, methods, and vehicles, the network of sensing devices may include one or more seat sensors, one or more interior cameras, and/or one or more microphones. In this instance, the predefined calibration settings may include seat sensor calibrations, camera calibrations, and/or microphone calibrations, each of which is designed to improve that sensor's ability to detect one or more symptoms in the predefined set of condition symptoms. After detecting a health-related event but prior to executing an ameliorative action, the vehicle controller may prompt the occupant to confirm that they are, in fact, in distress. The vehicle controller may then receive a user input from an HMI indicating that the health-related event is a false-positive. The vehicle controller may command a resident vehicle subsystem to execute a vehicle control operation in response to not receiving a user input indicating the health-related event is a false-positive.

For any of the disclosed systems, methods, and vehicles, the vehicle controller may identify an occupant's existing health condition by receiving one or more user inputs from the occupant that select or describe one or more of their existing health conditions. As another option, the resident vehicle subsystem that executes the mitigating control operation may include a passenger seat assembly with power seat controls. In this instance, the control operation includes commanding the power seat controls to move the passenger seat assembly to a preset protected position. Optionally, the resident vehicle subsystem may include the vehicle's powertrain; in this instance, the control operation may include disabling driver-commanded acceleration of the powertrain and/or reducing a torque output of the powertrain to selectively slow the vehicle. The resident vehicle subsystem may include the host vehicle's steering system; in this case, the control operation may include commanding the vehicle steering system to maneuver the vehicle to a protected location.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
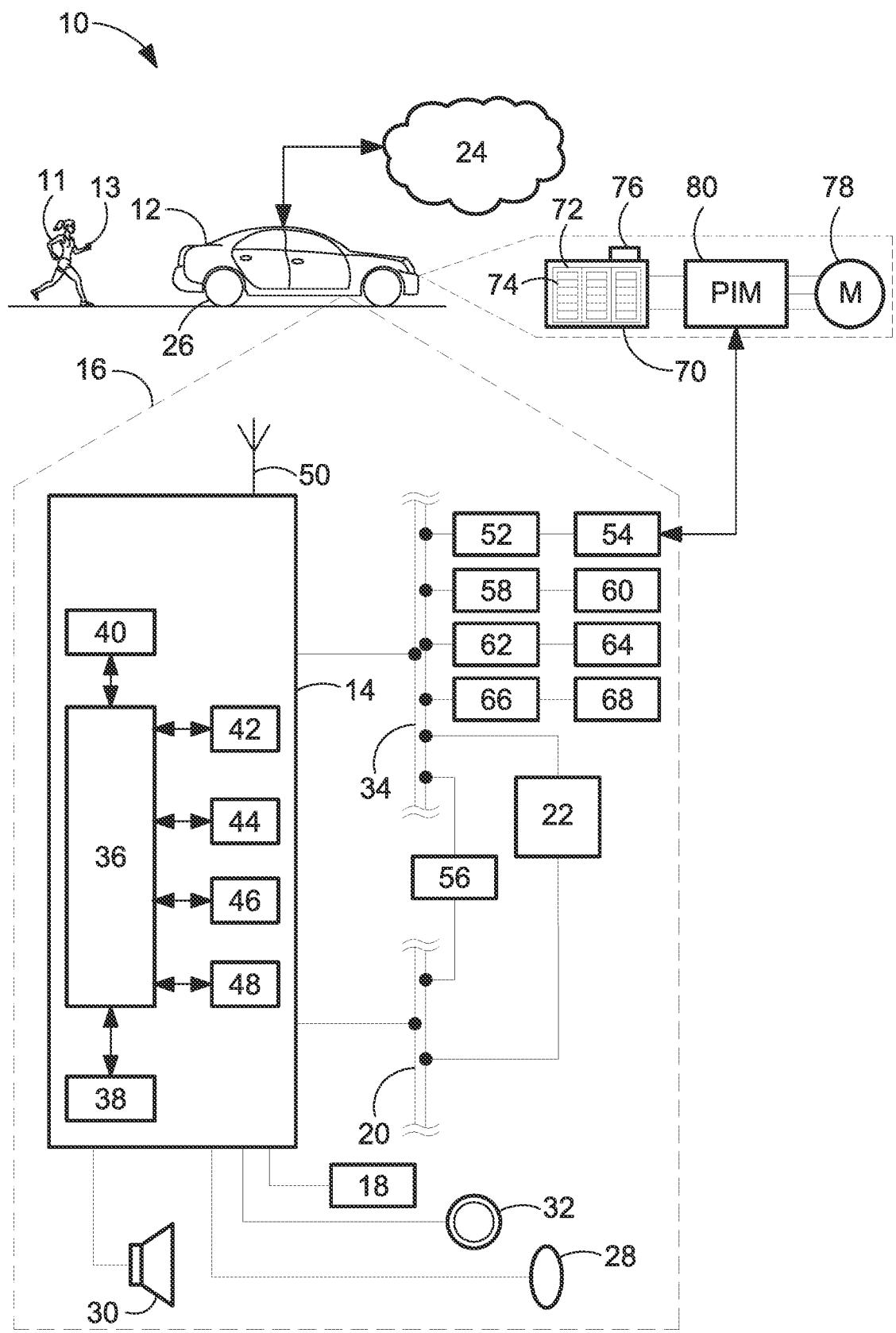
FIG. 1 is a schematic illustration of a representative intelligent motor vehicle with a network of in-vehicle controllers, sensing devices, and communication devices for provisioning adaptive vehicle sensing and automation to protect occupants with existing health conditions in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts by the illustrated network of electrical hardware should be appreciated as a non-limiting implementation of disclosed features. As such, it will be understood that aspects and features of this disclosure may be applied to other network architectures and may be incorporated into any logically relevant type of vehicle. Moreover, only select components of the motor vehicle and intelligent vehicle system are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RES S), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains.

The battery pack 70 may be designed such that module management, cell sensing, module-to-module and/or module-to-host communications functionality is integrated directly into each battery module 72 and performed by an integrated electronics package, such as a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., may collectively define a cell module assembly.

Upon entering the passenger cabin of a motor vehicle, e.g., during vehicle setup after initially purchasing the vehicle, a driver or other occupant (collectively "user") may activate an operator settings program mode and input any medical conditions or health concerns that may adversely affect that user while in the vehicle. A user may pick from a list of medical conditions, upload a related medical condition, or dictate/manually enter a medical condition. For each designated condition, a user may select a maximum length of time after detection of a corresponding health event before the vehicle intervenes to mitigate the event (e.g., disabled occupant waiting period of five (5) minutes for an asthma attack, three (3) mins for a heart attack, and zero (0) mins for full incapacitation).

Once a user has declared an existing health condition and input any desired system settings, the in-vehicle sensor or sensors of the passenger compartment specified for monitoring that condition may be automatically activated and calibrated to monitor that user each time they enter the vehicle. If the sensors—individually or collectively—recognize behavioral patterns or detect medically recognized symptoms that correlate with a medical condition, an intelligent occupant protection system may automatically engage a mitigation process to prevent harm to the user and other occupants of the vehicle. For vehicles with fully autonomous driving capabilities, system detection of a health-related medical event may trigger an autonomous driving protocol that drives the host vehicle to a preselected and/or closest health care facility (e.g., hospital, doctor, ER, medical center, etc.). Alternatively, the intelligent occupant protection system may collaborate with the host vehicle's ADAS module to pull the vehicle over to the side of the road and optionally contact EMS, a remote vehicle services system, or other first responders. The system may also trigger the vehicle's hazard lights, activate the vehicle's horn system, or automate other vehicle operations to signal that a user may be in distress.

While occupants and drivers remain accountable for their own actions and health conditions, disclosed intelligent occupant protection systems provide additional protections and precautions for those that may be susceptible to having a medical episode while driving. Disclosed features help to reduce any associated likelihood of a collision or harm to occupants of the host vehicle. Users may also be enabled to tailor some aspects of the host vehicle's response to a particular medical episode to their individual preferences. Other attendant benefits may include improving detection time by adapting vehicle sensing and calibration setting to each user's designated health conditions. Vehicle response protocols may protect unresponsive drivers by disabling the accelerator pedal, disabling the steering wheel, and moving the driver to a position that would reduce any potential harm that may be caused by the onset of a health-related episode.

Figure 2:
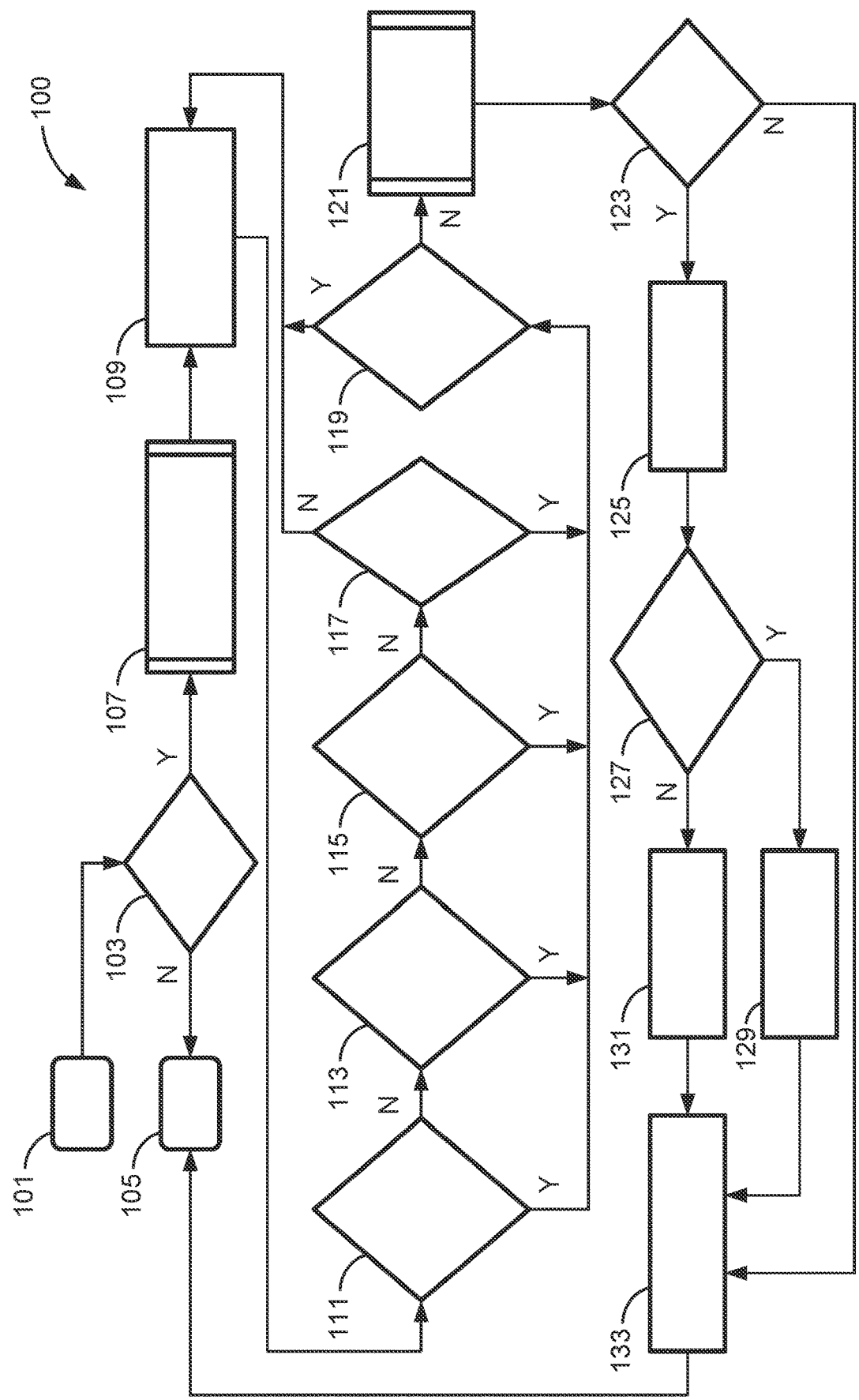
FIG. 2 is a flowchart illustrating a representative health condition monitoring protocol for detecting and mitigating a health-related event of an occupant, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for adaptive vehicle sensing and automation for monitoring and mitigating a health condition of an occupant of a vehicle, such as automobile 10 in FIG. 1, is generally described at 100 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 begins at START terminal block 101 of FIG. 2 with memory-stored, processor-executable instructions for a programmable controller or control module or similarly suitable processor to call up an initialization procedure for an occupant health monitoring protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 101 may initialize responsive to a user command prompt, a resident vehicle controller prompt, or a broadcast prompt signal received from an "off-board" centralized vehicle services system (e.g., host cloud computing service 24). By way of non-limiting example, the method 100 may automatically initialize in response to detection of a user entering the passenger compartment of a subject host vehicle, detection of a user sitting in a driver-side seat assembly, and/or detection of a key-on operation to start the host vehicle. Upon completion of some or all of the control operations presented in FIG. 2, the method 100 may advance to END terminal block 105 and temporarily terminate or, optionally, may loop back to terminal block 101 and run in a continuous loop.

From terminal block 101, method 100 advances to OCCUPANT HEALTH CONDITION decision block 103 to determine if an occupant in the passenger compartment of the subject host vehicle has an existing health condition. The user may be solicited by the host vehicle, e.g., through a visual or audible prompt via telematics unit 14 or speakers 30, to declare any user-specific health conditions and concerns. By way of example, and not limitation, user-declared health conditions may be input by: a user selecting one or more relevant health conditions from a preset list of medical conditions (e.g., a drop-down menu presented on display device 18); a user uploading one or more relevant health conditions from the Internet (e.g., using telematics unit 14 and LRC device(s) 44), from a portable memory device (e.g., a flash drive or SIM card), or from a personal computing device (e.g., using a laptop or tablet computer and SRC device(s) 46); and/or a user audibly dictating or manually entering one or more medical conditions (e.g., using microphone 28 or user input controls 32). Each user-input health condition may be linked to a memory-stored set of condition-specific symptoms, which may contain a respective list of medically recognized physical indicators that are signs of that health condition. In FIG. 1, a user 11 is shown inputting a health condition using a dedicated mobile application that is running on a wireless and cellular-enabled smartphone 13 and communicatively connected to the vehicle 10 via BLUETOOTH®. If the passenger cabin occupant or occupants of the host vehicle do not have any input health conditions (Block 103=NO), method 100 may proceed to END terminal block 105 and terminate.

Upon determining that at least one occupant of the host vehicle has at least one declared health condition (Block 103=YES), method 100 automatically executes SENSOR CALIBRATION predefined process block 107 and calibrates one or more in-vehicle sensors to increase the host vehicle's overall acuteness to the occupant's health condition. For instance, CPU 36 of FIG. 1 may access one of the memory devices 38 or contact cloud computing service 24 to retrieve a predefined set of calibration settings that is customized to the user's declared health condition. Sensor calibration may include designating and, if desired, dedicating a subset of the available in-vehicle sensing devices to monitor the user with the declared health condition. Each sensing device within this designated subset may be concomitantly recalibrated to operate according to a respective set of operating parameters that will increase that device's ability to readily and accurately sense a symptom associated with the declared health condition. In a non-limiting example, a passenger cabin camera may generally operate to monitor a driver's head and eye movement (i.e., "gaze detection"); if a subject driver has narcolepsy, this camera may be dynamically recalibrated to alter its operating thresholds and triggers in a manner driven by medical condition indicators of narcolepsy. It is also within the scope of this disclosure that a host vehicle be originally equipped with or retrofit to include one or more sensing devices dedicated to a user-specific health condition (e.g., a steering wheel, armrest, or seat assembly mounted heart rate monitor).

The predefined calibration settings for a given health condition may contain one or more adapted operating parameters for one or more of the in-vehicle sensors. For instance, the calibration settings may delimit a modified sensor sensitivity level, a modified sensor key-point trigger, a modified operating range, a modified offset value, etc., each of which has been engineered to improve a sensor's detection capabilities of a predefined condition symptom associated with an existing health condition. Accurate monitoring of a health-related symptom may necessitate that a sensor's start point for initiating a measurement cycle to acquire relevant data—its "sensor trigger"—be adapted to a key-point trigger value that is directly correlated with the onset of a health-related event. Tachycardia, which is a medically recognized to precipitate a heart attack, is evinced by a high resting heart rate in excess of 100 beats per minute (bpm); in this example, a key-point trigger for a seatback-mounted tactile transducer may be set to 100 vibrations/minute. Contrastingly, a sensor's calibrated sensitivity level may set a sensor output magnitude for a given sensor input. Assuming a linear relationship, the sensor sensitivity level may be defined as the slope of the output characteristic curve (dY/dX) or, more generally, a minimum input of a physical parameter that will create a detectable output. Using these predefined calibration settings, at least one sensor in the vehicle's network of sensing devices is recalibrated to better detect symptoms indicative of a medical event related to a user's declared health condition.

After recalibrating the in-vehicle sensor(s) at predefined process block 107, method 100 executes OCCUPANT MONITORING process block 109 to begin monitoring each occupant with an existing health condition to detect a health-related event based on the respective condition symptoms associated with that health condition. Symptom monitoring may include using recalibrated and, if desired, other existing in-vehicle sensors to track driver and occupant behavior in real-time to determine if a declared health condition has led to an event that has rendered a user incapacitated or susceptible to harm. The in-vehicle network of sensing devices may include any existing or hereafter developed sensing device that is operable to monitor a user in a passenger compartment of a host vehicle. Non-limiting examples of such in-vehicle sensors may include a seat sensor (e.g., pressure sensor, position sensor, haptic transducer, temperature sensor, etc.), a cabin camera (e.g., rearview mirror mounted gaze camera, backseat "baby" camera, etc.), and/or a microphone (e.g., A-pillar or overhead console mounted microphone). One or more of the seat-mounted sensors may be recalibrated according to a distinct set of seat sensor calibrations to more readily detect unusual user movement or a prolonged lack of user movement. Likewise, one or more of the cabin cameras may be recalibrated according to a distinct set of camera calibrations to more readily detect unusual user head/eye movement or a lack thereof, whereas an in-cabin microphone may be recalibrated according to a distinct set of microphone calibrations to more readily detect audible aspects of a predefined condition symptom.

With continuing reference to FIG. 2, the method 100 may execute any one or more or all of the MEDICAL EVENT ONSET decision blocks 111 through 119 to determine if a user with a declared health condition is experiencing a health-related event during operation of a host vehicle. It should be appreciated that the four illustrated health-related events, namely convulsive seizure, asthma attack, heart attack, narcoleptic episode, are representative in nature and, thus, not limiting of this disclosure. To that end, the method 100 may monitor any number and type of health conditions that may lead to a health-related medical event that may be detrimental to an occupant of a vehicle. At decision block 111, for example, method 100 determines if a seizure has been detected for a monitored user, e.g., by polling one or more seat-mounted sensors and one or more passenger-cabin cameras for data that indicates the user is experiencing abnormal weight shifts, irregular eye movement, uncontrollable head movement, etc. For decision block 113, method 100 determines if an asthma attack has been detected for a monitored user, e.g., based on data signals received from an in-cabin microphone detecting wheezing and gasping sounds and signals from a seatback sensor indicating abnormal chest movement. At decision block 115, method 100 determines if a heart attack has been detected, e.g., using a steering wheel-mounted heart monitor or wearable heart monitor to detect an abnormally high resting heart rate and using a seatback sensor to detect abnormal chest movement. Lastly, method 100 may use an internal camera and seat position and pressure sensors to detect a lack of user movement that is indicative of a narcoleptic episode, as indicated at block 117. If a health-related medical event is not detected (Block 111=NO & Block 113=NO & Block 115=NO & Block 117=NO), method 100 may loop back to block 109 and continue monitoring an occupant for a symptom associated a declared health condition.

Upon detecting a health-related medical event (Block 111=YES OR Block 113=YES OR Block 115=YES OR Block 117=YES), method 100 will attempt to corroborate whether or not any such medical event actually exists before automating a vehicle response. Recognizably, an intelligent occupant protection system may not be 100% accurate in predicting every instance of a health-related medical event as there may be some innate error in any such binary classification analysis that may lead to a false-negative or false-positive error. FALSE POSITIVE decision block 119 therefore confirms with an occupant of the vehicle that the detected medical event has occurred. For instance, if CPU 36 receives sufficient sensor data to determine that the driver 11 of host vehicle 10 has experienced a convulsive seizure, asthma attack, heart attack, or narcoleptic episode, telematics unit 14 of FIG. 1 may display a prompt to the driver or a passenger to confirm that the driver is, in fact, in distress. The driver or passenger may employ user input controls 32 or other similarly suitable HIM device to input that the health-related event is a false-positive result. If a false-positive has occurred (Block 119=YES), method 100 may return to process block 109 and continue monitoring the occupant(s) in the host vehicle's passenger cabin.

Absent confirmation that the detected health-related event is a false-positive error (Block 119=NO), method 100 responsively executes OCCUPANT SAFEGUARD PROTOCOL process block 121 to engage vehicle-automated functional mitigation procedures for the detected event based on the associated health condition. At this juncture, one or more controller-controlled, condition-specific responses are carried out by the host vehicle to mitigate any attendant repercussions of the detected medical event. Recognizing that each event may have respective symptoms and effects that necessitate a distinct response, the mitigation procedures may be tailored to address the user's specific condition and the resultant medical event. CPU 36 of FIG. 1, for example, may access the resident memory device 38 to call-up a respective response protocol that has been customized to the health-related event of the user's health condition. Using this customized response protocol, the CPU 36—either directly or through communication with the appropriate control module (e.g., PCM 52, ADAS module 54, EBCM 56, SCM 58 or BSCM 60)—commands one or more of the vehicle's resident subsystems to execute a vehicle control operation that is designed to mitigate the health-related medical event.

By receiving advanced notification of an existing health condition and synchronously modulating the in-vehicle sensors to monitor for and detect specific characteristics of that condition, the vehicle control system is able adapt the functional mitigation procedures to moderate the resultant episode. In instances where it may be desirable to move the driver away from the vehicle controls or move the driver to a laying or sideways posture, the CPU 36 may command the power seat controls of a driver-side seat assembly to move the seat assembly to a preset protected position and, thus, place the driver in a protected posture and position tailored to the detected event. In instances where a driver becomes incapacitated or cannot control their bodily movements, the CPU 36 may disable all driver-commanded acceleration of the vehicle (e.g., disable accelerator pedal increases of torque output from the vehicle powertrain) and/or reduce the torque output of the vehicle powertrain to selectively slow the vehicle. In instances where the driver is no longer able to steer the vehicle to a secure location, the CPU 36 may command the vehicle's steering system to maneuver the vehicle to a protected location (e.g., pull over to the shoulder of the road, pull into a parking lot/spot, etc.). At the same time, the driver's seatbelt may be automatically unbuckled, the vehicle door locks may be unlocked, the vehicle's hazard lights may be activated, and an EMS team may be contacted. There are numerous other examples of assorted system-automated responses that may be carried out, singly and collectively, to mitigate a given event.

There may be a preset list of health-related events that necessitate immediate medical attention and, thus, may warrant the intelligent occupant protection system taking heightened actions to mitigate the event and safeguard the distressed occupant. At AUTONOMOUS DRIVING decision block 123, for example, method 100 determines whether or not the host vehicle has sufficient autonomous driving capabilities (e.g., SAE Levels 4 or 5 autonomy) to drive the occupant to a location where they can receive urgent medical attention. It should be appreciated that decision block 123 may be omitted from method 100 in instances where it has already been established that the host vehicle has sufficient autonomous driving capabilities (e.g., a fully autonomous hands-free driving system). If the vehicle does not have autonomous driving capabilities (Block 123=NO), method 100 may responsively advance to FIRST RESPONDER process block 133 and contact a first responder (e.g., ambulance, police, fire department etc.) and/or link to a remote vehicle services provider (e.g., cloud computing host service 24), e.g., to request immediate assistance be dispatched to the host vehicle.

Upon determining that the host vehicle does have sufficient autonomous driving capabilities (Block 123=YES), the method 100 may execute process block 125 and generate a predicted route for traversing from the host vehicle's current (real-time) location to the location of a closest or a preselected health care facility (e.g., hospital, doctor's office, ER, medical center, etc.). This predicted route may be derived by an onboard vehicle navigation system and, if desired, presented to the user, e.g., via telematics display device 18. Advancing to ROUTE APPROVAL decision block 127, the method 100 may determine whether or not the user has either input an acceptance of the predicted route or designated a desired alternate route using any of the herein described HMI devices. If so (Block 127=YES), method 100 responsively executes EMERGENCY DESTINATION process block 129 and commands the host vehicle to effectuate any and all necessary autonomous features to drive the host vehicle to the designated health care facility. If the user has not approved the predicted route or designated an alternate route (Block 127=NO), method 100 may proceed to execute PULL OVER process block 131 and cause the host vehicle to move to the side of or off the road. It should be recognized that the only occupant of the vehicle may be incapacitate or in distress and therefore cannot submit any sort of route selection or approval; in this case, decision block 127 may be omitted from method 100 and either process block 129 or process block 131 be automatically executed depending on the nature of the health-related medical event.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a vehicle with a passenger compartment containing a network of sensing devices communicating with a vehicle controller, the method comprising:

determining, via the vehicle controller, a declared existing health condition of an occupant in the passenger compartment;

retrieving, via the vehicle controller from a memory device after determining the declared existing health condition of the occupant, a predefined set of calibration settings and a predefined set of condition symptoms both customized to the declared existing health condition;

calibrating the network of sensing devices in the passenger compartment using the retrieved predefined set of calibration settings to detect one or more symptoms in the predefined set of condition symptoms customized to the declared existing health condition;

monitoring, via the network of sensing devices after being calibrated to the predefined set of calibration settings, the occupant to detect the one or more symptoms in the predefined set of condition symptoms and thereby detect a health-related event based on the predefined set of condition symptoms; and transmitting, via the vehicle controller responsive to detecting the health-related event, a command signal to a resident vehicle subsystem of the vehicle to execute a vehicle control operation configured to mitigate the health-related event.

2. The method of claim 1, wherein the predefined set of calibration settings is retrieved from a plurality of sets of calibration settings and includes a modified sensor sensitivity level and/or a modified sensor key-point trigger both specific to at least one symptom in the predefined set of condition symptoms of the declared existing health condition.

3. The method of claim 1, wherein the predefined set of condition symptoms is retrieved from a plurality of sets of condition symptoms and includes a respective list of objective physical characteristics indicative of the declared existing health condition.

4. The method of claim 1, further comprising retrieving, via the vehicle controller from a plurality of predefined response protocols stored in the memory device, a respective response protocol customized to the health-related event of the declared existing health condition, wherein the vehicle control operation executed by the resident vehicle subsystem is based on the respective response protocol.

5. The method of claim 1, further comprising:
determining if the vehicle has autonomous driving capabilities; and
transmitting, via the vehicle controller responsive to determining that the vehicle has autonomous driving capabilities, multiple command signals to multiple vehicle subsystems to autonomously drive the vehicle to a health care facility.

6. The method of claim 5, further comprising:
determining, via the vehicle controller responsive to determining the vehicle has autonomous driving capabilities, a predicted route for traversing from a current location of the vehicle to a facility location of the health care facility; and
receiving, from a human-machine interface via the vehicle controller, a user input from the occupant approving the predicted route, wherein transmitting the command signals to autonomously drive the vehicle to the health care facility is further in response to receiving the user input approving the predicted route.

7. The method of claim 1, wherein the network of sensing devices includes a seat sensor, a camera, and/or a microphone, and wherein the predefined set of calibration settings includes seat sensor calibrations, camera calibrations, and/or microphone calibrations tailored to detecting the one or more symptoms in the predefined set of condition symptoms.

8. The method of claim 1, further comprising:
receiving, from a human-machine interface via the vehicle controller after detecting the health-related event, a user input from the occupant indicating the health-related event is a false-positive result, wherein transmitting the command signal to the resident vehicle subsystem is further in response to not receiving the user input indicating the health-related event is the false-positive result.

9. The method of claim 1, wherein determining the declared existing health condition includes receiving, from a human-machine interface via the vehicle controller, a user input from the occupant indicating the declared existing health condition.

10. The method of claim 1, wherein the resident vehicle subsystem includes a passenger seat assembly with power seat controls, and wherein the control operation includes commanding the power seat controls to move the passenger seat assembly to a preset protected position.

11. The method of claim 1, wherein the resident vehicle subsystem includes a vehicle powertrain, and wherein the control operation includes disabling driver-commanded acceleration of the vehicle powertrain and/or reducing a torque output of the vehicle powertrain to selectively slow the vehicle.

12. The method of claim 1, wherein the resident vehicle subsystem includes a vehicle steering system, and wherein the control operation includes commanding the vehicle steering system to maneuver the vehicle to a protected location.

13. A non-transitory, computer-readable medium storing instructions executable by one or more processors of a vehicle controller of a vehicle, the vehicle including a passenger compartment containing a network of sensing devices communicating with a vehicle controller, the instructions, when executed by the one or more processors, causing the vehicle controller to perform operations comprising:
- determining a declared existing health condition of an occupant in the passenger compartment;
- retrieving, from a memory device after determining the declared existing health condition of the occupant, a predefined set of calibration settings and a predefined set of condition symptoms both customized to the declared existing health condition;
- calibrating one or more sensors in the network of sensing devices using the retrieved predefined set of calibration settings to detect one or more symptoms in the predefined set of condition symptoms customized to the declared existing health condition;
- monitoring, using the network of sensing devices after being calibrated to the predefined set of calibration settings, the occupant to detect the one or more symptoms in the predefined set of condition symptoms and thereby detect a health-related event based on the predefined set of condition symptoms; and
- transmitting, responsive to detecting the health-related event, one or more command signals to one or more resident vehicle subsystems of the vehicle to execute one or more vehicle control operations configured to mitigate the health-related event.

14. A motor vehicle, comprising:
- a vehicle body with a passenger compartment;
- a plurality of road wheels attached to the vehicle body;
- a prime mover attached to the vehicle body and operable to drive one or more of the road wheels to thereby propel the motor vehicle;
- a network of sensing devices contained in the passenger compartment; and a vehicle controller programmed to:
  - determine a declared existing health condition of an occupant in the passenger compartment;
  - retrieve, from a memory device after determining the declared existing health condition of the occupant, a predefined set of calibration settings and a predefined set of condition symptoms both customized to the declared existing health condition;
  - calibrate the network of sensing devices using the retrieved predefined set of calibration settings to detect symptoms in the predefined set of condition symptoms customized to the declared existing health condition;
  - monitor, using the network of sensing devices after being calibrated to the predefined set of calibration settings, the occupant to detect the one or more symptoms in the predefined set of condition symptoms and thereby detect a health-related event based on the predefined set of condition symptoms; and
  - responsive to detecting the health-related event, transmit a command signal to a resident vehicle subsystem of the vehicle to execute a vehicle control operation configured to mitigate the health-related event.

15. The motor vehicle of claim 14, wherein the predefined set of calibration settings includes a modified sensor sensitivity level and/or a modified sensor key-point trigger both specific to at least one symptom in the predefined set of condition symptoms of the declared existing health condition.

16. The motor vehicle of claim 14, wherein the predefined set of condition symptoms includes a respective list of objective physical characteristics indicative of the declared existing health condition.

17. The motor vehicle of claim 14, wherein the vehicle controller is further programmed to retrieve, from the memory device, a respective response protocol customized to the health-related event of the declared existing health condition, wherein the vehicle control operation executed by the resident vehicle subsystem is based on the respective response protocol.

18. The motor vehicle of claim 14, wherein the vehicle controller is further programmed to transmit multiple command signals to multiple vehicle subsystems to autonomously drive the vehicle to a health care facility.

19. The motor vehicle of claim 14, wherein the network of sensing devices includes a seat sensor, a camera, and/or a microphone, and wherein the predefined set of calibration settings includes seat sensor calibrations, camera calibrations, and/or microphone calibrations tailored to detecting one or more symptoms in the predefined set of condition symptoms.

20. The motor vehicle of claim 14, wherein the vehicle controller is further programmed to:
- receive, from a human-machine interface after detecting the health-related event, a user input from the occupant indicating the health-related event is a false-positive result,
- wherein transmitting the command signal to the resident vehicle subsystem is further in response to not receiving the user input indicating the health-related event is the false-positive result.

\* \* \* \* \*